United States Patent
Sexton et al.

(10) Patent No.: US 12,417,789 B2
(45) Date of Patent: Sep. 16, 2025

(54) SYSTEMS AND METHODS FOR GENERATING VIDEOS FROM SCRIPTED READINGS

(71) Applicant: Sexton Arts, LLC, Fairfax, CA (US)

(72) Inventors: Michael John Sexton, Fairfax, CA (US); Margaret K. Hicks, Rohnert Park, CA (US); Lawrence E. Garrigan, Fairfield, CA (US)

(73) Assignee: Sexton Arts, LLC, Fairfax, CA (US)

( * ) Notice: Subject to any disclaimer, the term of this patent is extended or adjusted under 35 U.S.C. 154(b) by 0 days.

(21) Appl. No.: 18/560,910

(22) PCT Filed: May 3, 2022

(86) PCT No.: PCT/US2022/027459
§ 371 (c)(1),
(2) Date: Nov. 14, 2023

(87) PCT Pub. No.: WO2022/256106
PCT Pub. Date: Dec. 8, 2022

(65) Prior Publication Data
US 2024/0257836 A1    Aug. 1, 2024

Related U.S. Application Data

(60) Provisional application No. 63/196,608, filed on Jun. 3, 2021.

(51) Int. Cl.
| | | |
|---|---|---|
| G11B 27/031 | (2006.01) | |
| G06F 40/205 | (2020.01) | |
| H04N 23/60 | (2023.01) | |

(52) U.S. Cl.
CPC .......... *G11B 27/031* (2013.01); *G06F 40/205* (2020.01); *H04N 23/64* (2023.01)

(58) Field of Classification Search
CPC ............................. G11B 27/031; G06F 40/205
See application file for complete search history.

(56) References Cited

U.S. PATENT DOCUMENTS

| | | |
|---|---|---|
| 7,024,677 B1 | 4/2006 | Snyder et al. |
| 8,219,502 B2 | 7/2012 | Gold et al. |
| 8,341,525 B1 | 12/2012 | Achour et al. |
| 8,621,354 B2 | 12/2013 | Henderson et al. |
| 9,904,871 B2 | 2/2018 | Merhav et al. |

(Continued)

*Primary Examiner* — Mishawn N. Hunter
(74) *Attorney, Agent, or Firm* — Santa Fe IP, LLC

(57) ABSTRACT

A computer-implemented method is provided for generating videos from a script read aloud by a user. The method includes: storing a questionnaire; presenting discrete prompts to the user via a user device; recording a user response to the discrete prompts; generating a video script based upon the user responses; recording a raw video of the user including initial and subsequent readings; transcribing the raw video to generate a transcription; segmenting the transcription into a plurality of word groupings; matching each word grouping to a portion of a script line; calculating a confidence level of the matching; comparing the confidence level between the readings to determine best takes; selecting the best takes to populate the video script; processing the raw video into video fragments corresponding to the best takes; and generating a final video of the entire video script. A system implementing the method is also disclosed.

20 Claims, 5 Drawing Sheets

(56) References Cited

U.S. PATENT DOCUMENTS

| | | |
|---|---|---|
| 10,079,993 B2 | 9/2018 | Kerr et al. |
| 10,104,355 B1 * | 10/2018 | Clark .................. G11B 27/105 |
| 10,163,359 B2 | 12/2018 | Aguayo, Jr. et al. |
| 10,334,328 B1 | 6/2019 | Rosen et al. |
| 10,728,443 B1 * | 7/2020 | Olshansky ......... G06Q 10/1053 |
| 2004/0186743 A1 | 9/2004 | Cordero, Jr. |
| 2011/0052155 A1 | 3/2011 | Desmarais et al. |
| 2011/0246571 A1 | 10/2011 | Klier et al. |
| 2013/0216206 A1 | 8/2013 | Dubin et al. |
| 2015/0004571 A1 * | 1/2015 | Ironside ................. G09B 7/073 434/185 |
| 2019/0311331 A1 * | 10/2019 | Steinhoff ........... G06Q 10/1053 |
| 2020/0175987 A1 | 6/2020 | Thomson et al. |
| 2020/0226701 A1 * | 7/2020 | Griebat ................. H04L 41/026 |
| 2020/0227033 A1 | 7/2020 | Gustman et al. |
| 2020/0278991 A1 | 9/2020 | Canter et al. |

* cited by examiner

SYSTEMS AND METHODS FOR GENERATING VIDEOS FROM SCRIPTED READINGS

CROSS-REFERENCES TO RELATED APPLICATIONS

This application is a National Stage of International Patent Application No. PCT/US2022/027459 filed May 3, 2022 and published as WO 2022/256106 A1 on Dec. 8, 2022, which application claims priority to U.S. Provisional Patent Application No. 63/196,608 filed Jun. 3, 2021, the entire contents of which applications are incorporated herein by this reference.

BACKGROUND OF INVENTION

Field of Invention

This application relates, in general, to systems for generating videos from a script read aloud by a user, as well as methods of use.

Description of Related Art

Currently, there are millions of people looking for jobs. While resumes on high-quality bond paper and in-person interviews were the norm for decades, today's job seekers must utilize various online platforms for networking to find jobs, attending virtual recruitment fairs, filling out job applications, and even interviewing for jobs online. As such, it is increasingly difficult for today's job seekers to distinguish themselves from other job seekers.

Accordingly, today's job seekers often turn to career coaches or life coaches to identify and/or develop core skills and value messages to create better first impressions with potential employers. And some turn to video production companies to create introductory branding videos and messages. In either case, such services are highly personalized and generally expensive. Creating acceptable personal branding videos can be a very time and resource consuming process, and is essentially an unscalable process.

There is an unmet need in the field for affordable and more rapid means of generating videos from a script read aloud by a user. The present disclosure meets these and other needs by providing systems and methods for doing so.

BRIEF SUMMARY

One aspect of the present invention is directed to a computer-implemented method for generating a video from a script read aloud by a user including: storing a questionnaire including a plurality of discrete prompts; presenting the plurality of discrete prompts to the user via a user device; recording a user response to each of the discrete prompts via the user device; generating a video script based upon the user responses to each of the plurality of discrete prompts, the video script including a plurality of script lines; recording a raw video of the user via the user device, the raw video including: (a) an initial reading during which (i) a first script line is provided to the user and the user repeats the first script line, and (ii) a final script line is provided to the user and the user repeats the final script line; and (b) a subsequent reading by the user via the user device during which (i) the first script line is provided to the user and the user repeats the first script line, and (ii) the final script line is provided to the user and the user repeats the final script line; transcribing the raw video to generate a transcription including the initial reading and the subsequent reading, the transcription including identified words of the initial and subsequent readings; segmenting the transcription into a plurality of segments, each segment including a word grouping; matching each word grouping to a portion of each script line; calculating a confidence level of the matching between each word grouping and each portion of each script line; comparing the confidence level of each word grouping from the initial reading with the confidence level of a corresponding word grouping from the subsequent reading to determine a best take between the each of the corresponding word groupings; selecting the best takes for each portion of each script line to populate the video script; processing the raw video into a plurality of video fragments, each video fragment corresponding to each of the best takes; and/or generating a final video of the entire video script, the final video including each of the video fragments corresponding to each of the best takes.

Another aspect of the present invention is directed to a system for generating a video from a scripted reading by a user, the system including a server configured to act as a host web server for communications with the user via a user device coupled to the server via a computer network, the server including one or more processors and memory. The one or more processors run software that is configured to perform the above steps.

Yet another aspect of the present invention is directed to a video sequence generated by a method including the above steps.

Embodiments of the invention may include one or more of the following features.

The storing a questionnaire may include storing a plurality of field-specific questionnaires, each field-specific questionnaire including a plurality of discrete field-specific prompts.

At least one of the field-specific questionnaires may include field-specific prompts for one or more of the following fields: new college graduates; professional job seekers; marketing professionals; or real estate agents.

The method may further include: analyzing and revising the user responses to each of the discrete prompts; generating and presenting a preliminary script to the user via the user device; and recording user feedback based upon the preliminary script; wherein generating the video script is based upon the user feedback.

The method may further include assessing a camera and a microphone of the user device and adjusting the camera and microphone of the user device to predetermined criteria.

The method may further include coaching the user in reading the video script via the user device.

Coaching the user may include providing a plurality of coaching prompts that instruct the user to (i) properly adjust a camera of the user device, (ii) look toward the camera, and/or (iii) properly speak toward a microphone of the user device.

The recording a raw video may be accomplished by storing the raw video (i) on the user device and/or (ii) in a cloud-based storage system.

The first and final script lines may be audibly provided to the user via the user device.

The method may further include determining the type of raw video and transcoding the raw video into a predetermined video format.

The transcribed video may also include a word timestamp for each of the identified words, and each word grouping may have a grouping timestamp.

When multiple word groupings have similar confidence levels, the best take may be based on the respective word timestamps and the respective grouping timestamps.

The transcription includes N words, and segmenting the transcription may include segmenting (i) every word into a respective word grouping, (ii) every two words into a respective word grouping, (iii) every three words into a respective word grouping, and so on to (iv) every N-words into a respective grouping.

The confidence level may be based one or more of the following parameters: timing, cadence, volume, speed, intonation, or diction.

The confidence level may be based on factors pertaining to the percentage of matching words of each word grouping to each portion of each script line.

The method may further include generating a personal branding page for the user, and the final video may be displayed on the personal branding page.

The scripted reading may be a scripted interview, and the final video may be a video branding message including the video script.

The systems and methods in accordance with various aspects of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents, and other embodiments, which may be included within the spirit and scope of the invention(s) as defined by the appended claims.

As noted above, it is increasingly difficult for today's job seekers to distinguish themselves from other job seekers utilizing available tools. A job seeker may want to provide prospective employers with a better sense of their identity, professionalism, and skills than which can be conveyed by a paper resume or curriculum vitae, or by available online platforms. Similarly, recent college graduates, doctors, lawyers, marketing specialists, realtors, and other professionals may want to provide a personally curated branding message to potential clients, colleagues, or employers. To assist in creating such personal branding messages, various aspects of the present invention provide for generating a video from a script read aloud by a user. The systems and methods described herein provide users with an easy-to-use platform to create a personal branding video.

Figure 1:
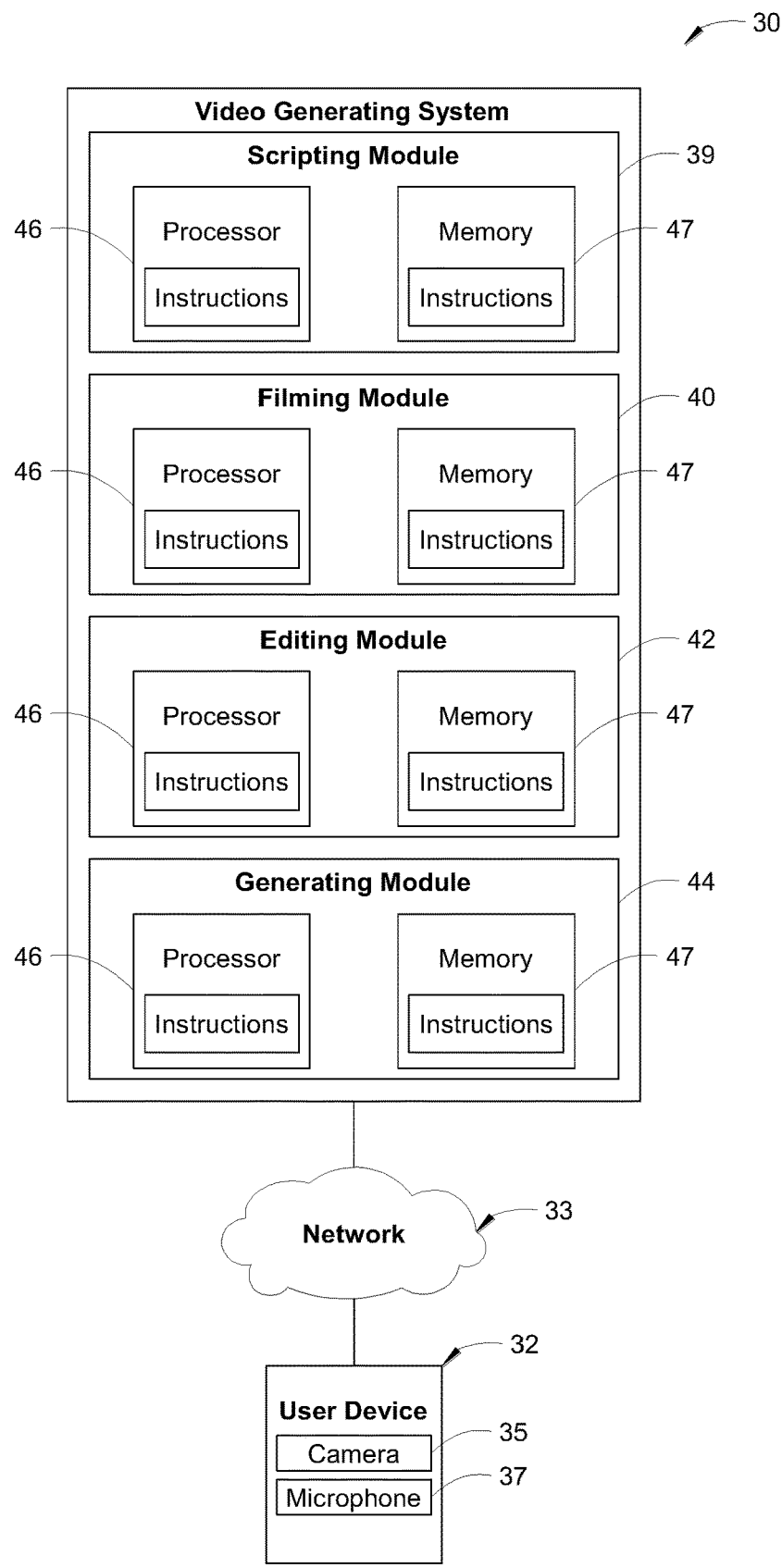
FIG. 1 is a block diagram illustrating an exemplary system for generating videos from a script read aloud by a user in accordance with various aspects of the present invention.

Turning now to the drawings, wherein like components are designated by like reference numerals throughout the various figures, FIG. 1 illustrates an exemplary video generating system 30 for generating videos from scripted readings in accordance with various aspects of the present invention. As shown, the system is configured to cooperate with and control user devices 32 via a network 33.

While only one user device is shown for the sake of clarity, one will appreciate that the video generating system may communicate with a number of users via their individual user devices, each independently communicating with the video generating system. In particular, the video generating system provides a platform to individual one-time customers, multi-use subscribers, organizations and other users, each of which may access the platform via their individual user device having a camera 35 and a microphone 37. One will also appreciate that various devices capable of internet communications may be used, including, but not limited to smartphones, tablets, notebooks, laptops, desktops, personal digital assistants, and other electronic devices.

The network may include the internet, the world wide web (WWW), an intranet and/or wireless network such as a cellular telephone network, a wide area network (WAN), a local area network (LAN), a proprietary network, an institutional network, a cable television network, a public switched telephone network (PSTN), a combination of these, and/or other types of networks generally available.

With continued reference to FIG. 1, system 30 generally includes a scripting module 39, a filming module 40, an editing module 42, and a generating module 44. Generally, the video generating system includes a computer system configured to execute instructions (e.g., program code or software) for each module to perform any one or more of the processes described herein.

The computer system may include one or more server computers, client computers, personal computers (PCs), network routers, network switches, network bridges, or other computing device and/or hardware device that is capable of executing instructions of the various modules specifying actions to be taken by the system.

While only a single system is illustrated for the sake of clarity, one will appreciate that one or more systems may be provided, and each may include any collection of computing and/or hardware devices that individually or jointly execute instructions to perform any one or more of the processes described. One will also appreciate that the system may perform a service offered by a provider, and its servers may be the provider's internal servers, external third-party servers, or a combination thereof in a cloud computing environment.

An exemplary video generating system 30 includes one or more processing units such as a central processing unit (CPU), a graphics processing unit (GPU), a digital signal processor (DSP), and/or other suitable devices. Generally, each module performs its various functions and methods on one or more processors 46 and with memory 47 (e.g., random access memory) storing one or more software programs and/or instruction sets for execution by the one or more processors.

One will appreciate that the processers may be located on a common device or on one or more devices, and that the memory may reside on a common device or on one or more devices. Various software programs and/or instructions in the form of machine-readable media for execution by the processor(s) may reside within the memory and/or within the processor (e.g., within its cache memory) of each module for execution thereof by system. In the event the modules are located on separate devices, the instructions may be transmitted or received over a network in an otherwise conventional manner. One will also appreciate that one or more modules may utilize one or more of the same processors and may utilize common or different memory storage. Furthermore, the memory may store additional modules and data structures not described above.

Figure 6:
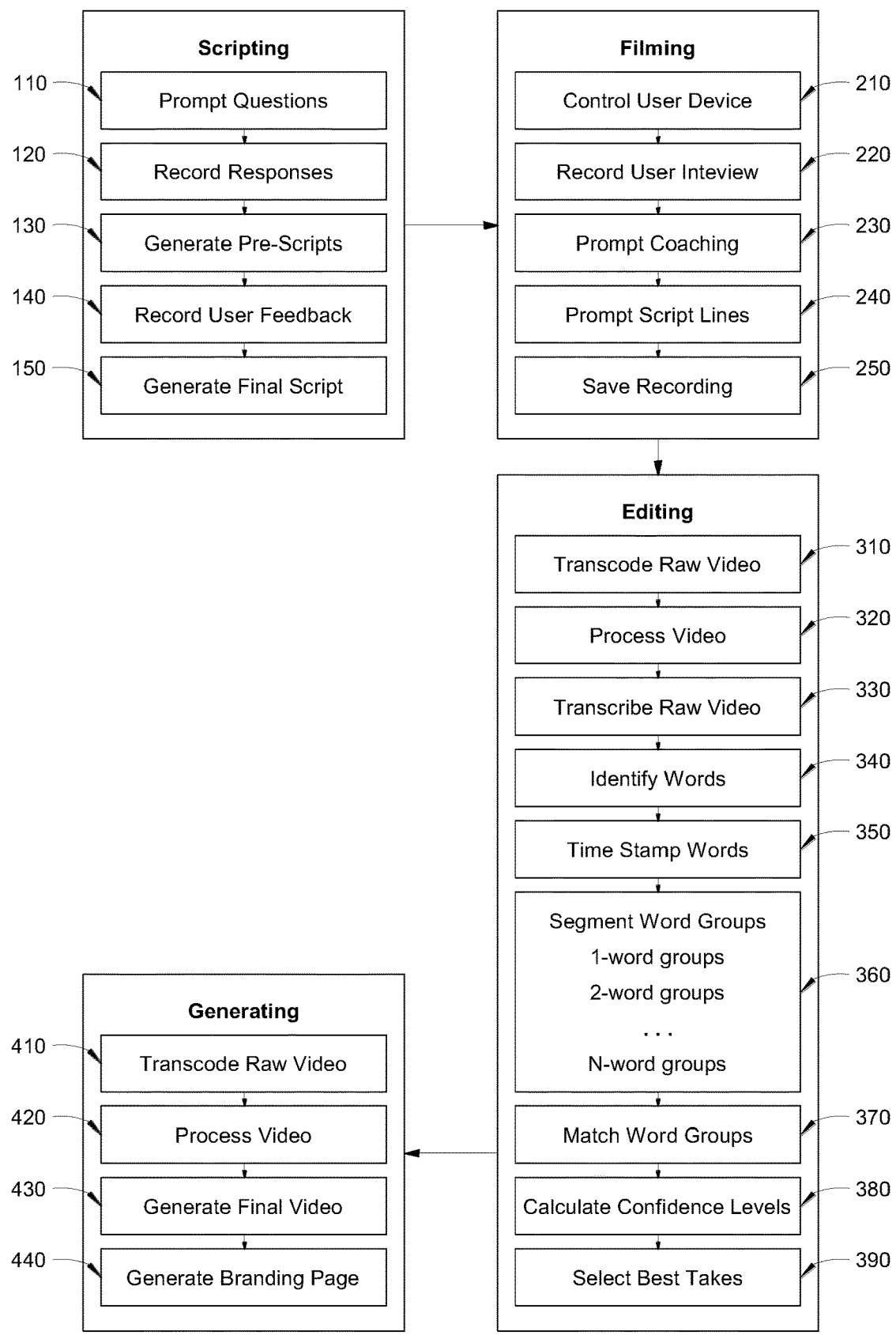
FIG. 6 is a flowchart illustrating a process for generating videos from scripted readings in accordance with various aspects of the present invention.

With reference to FIG. 6, the scripting module is generally configured for creating script lines that will form the basis of the personal branding message. The scripting phase provides a series of questions to a user (step 110), records the user's responses (step 120), generates a preliminary video script for review by the user (step 130), records the user's feedback (step 140), and generates a final script (step 150). One will appreciate that pre-scripting and feedback are optional processes, but they are generally preferred in order to provide a more polished, professional, and personal branding message.

Figure 2:
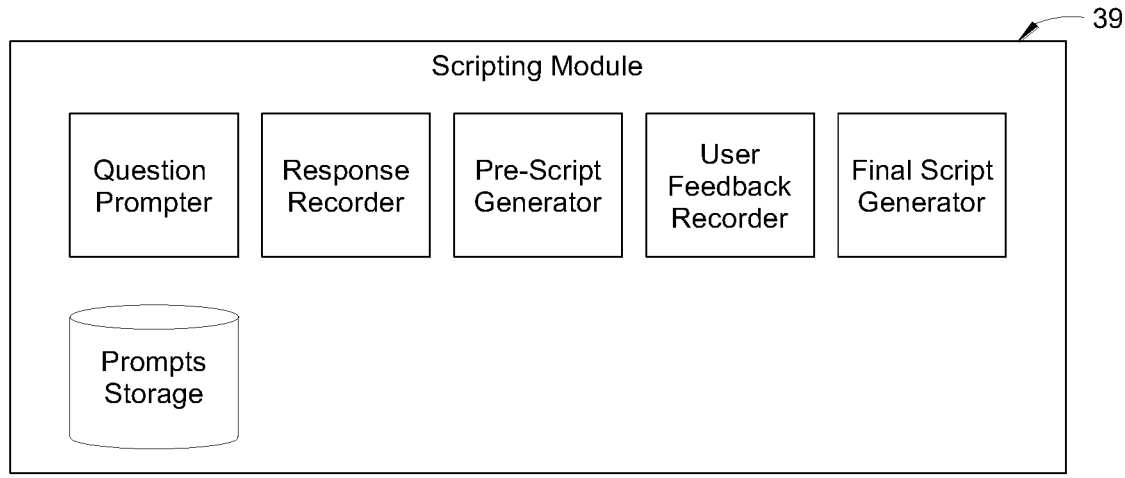
FIG. 2 is a block diagram illustrating an exemplary scripting module of the system of FIG. 1.

Turning to FIG. 2, scripting module 39 includes a question prompter that provides a user with a series of questions, each of which may be in the form of a series of discrete prompts communicated to the user via user device 32. Alternatively, a system administrator may provide questions to the user via a series of audible and/or visual prompts. In either case, the scripting module preferably includes a prompts storage held in memory, which storage includes a database of a wide variety of questions that are relevant to the various users.

The series of questions is preferably unique to various fields and/or professions. For example, the scripting module may store a wide variety of field-specific questionnaires, each questionnaire including a plurality of discrete field-specific prompts that are pertinent to personal branding messages of new college graduates, professional job seekers, marketing professionals, real estate agents, and the like.

The prompts may be automatically generated via artificial intelligence (AI) and/or machine learning (ML) to identify and provide relevant questions pertinent to the user's desired field or profession. For example, the scripting module may include a speech recognition function to analyze the user's responses, and AI/ML may analyze the responses and provide additional questions based upon the user's responses. Various AI and ML algorithms may be used to produce sets of specialized questions including, but not limited to, logistic regression, artificial neural networks, decision tree learning, and the like.

Scripting module 39 also includes a response recorder that records the user's response to each of the discrete prompts via user device 32. For example, the user device may record a video of the user providing responses to the series of questions, record the user's audible responses to the series of questions, and/or record the user's typed, written, or other manual responses to the series of questions.

The scripting module includes a script generator that then generates a script based upon the user's responses to each of the discrete prompts, that is, based upon the user's responses to each of the series of questions. The video script generally includes a plurality of script lines sufficient for generating a personal branding message of a desired length. For example, the scripting module may generate two, three, four or more script lines that give rise to a personal branding message lasting approximately 40-60 seconds or longer when read aloud by the user. One will appreciate that the number of script lines and/the length of time may vary considerably depending upon user preference, the intended audience, and/or other factors.

Scripting module 39 may generate a video script directly from the user's responses to the question prompts, or the scripting module may be configured to analyze and revise the user's responses to each of the discrete prompts in order to enhance the script. For example, AI and/or ML may be utilized to predict additional questions based upon the user's initial responses, in which case, a pre-script generator may provide a preliminary script and/or additional questions in a manner similar to the question prompter. A user feedback recorder may then record the user's supplemental responses, and a final-script generator may generate a video script based upon both the user's responses to the discrete prompts of the question prompter and the user's feedback to the pre-script generator.

In its simplest form, the scripting module may allow an administrator to audibly and/or visually provide the question prompts to the user, record the user's responses, and provide a final script for the user based upon a machine. The administrator may also provide suggested answers to the user to improve the scripts and may also determine the order of the user's responses in generating the scripts. One will appreciate, however, that the use of AI and ML in generating the question prompts and scripts (preliminary or final) will significantly improve scalability.

With reference to FIG. 6, the filming module is generally configured for filming the user "interview" that will form the basis of the personal branding message. The filming phase allows for control of the user's device (step 210), recording the user interview during an on-device session (step 220), prompt coaching of the user during the user interview (step 230), prompt script lines to be read aloud by the user during the user interview (step 240), and save the recording of the user interview (step 250).

Figure 3:
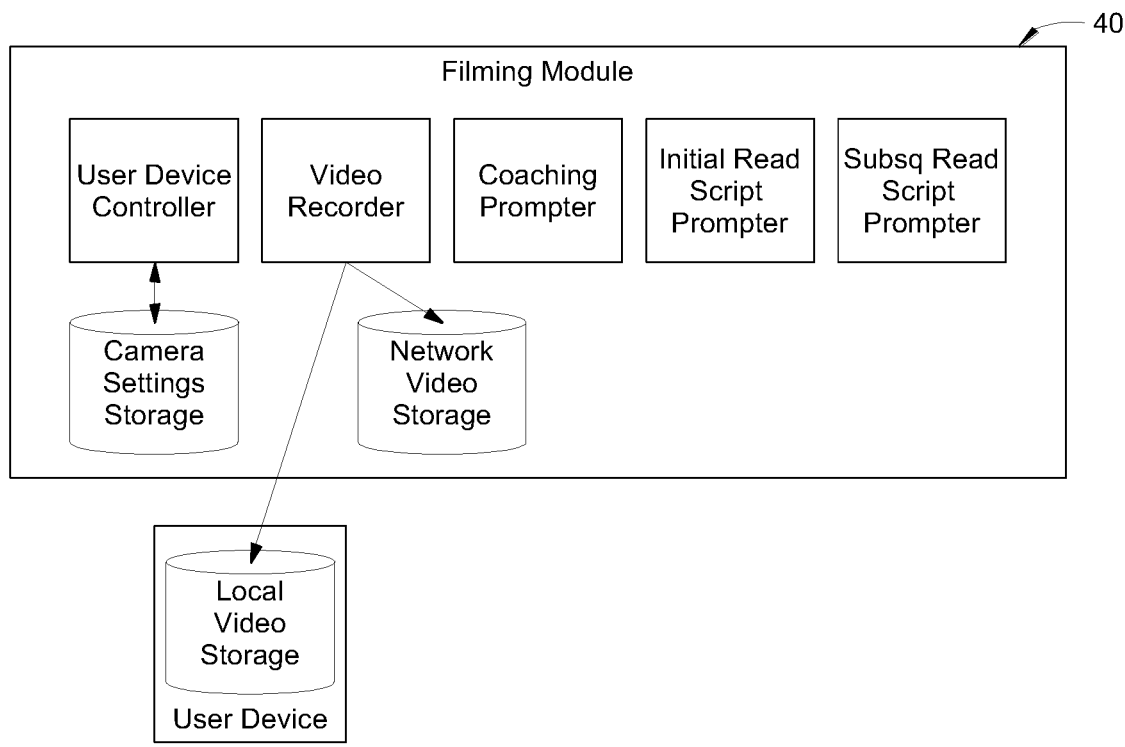
FIG. 3 is a block diagram illustrating an exemplary filming module of the system of FIG. 1.

Upon user login, the user's equipment and its capabilities may be recognized by the system. With reference to FIG. 3, filming module 40 may assess camera 35 and microphone 37 of the user's device 32 and adjust the camera and microphone in accordance with predetermined criteria. For example, the filming module may include a camera settings storage having a database of camera and microphone settings for the purpose of detecting and adjusting the user's camera and microphone for optimal recording results.

The database may include the adjustable parameters of a wide variety of smartphones such as the Apple iPhone and the Samsung Galaxy, tablets such as the Apple iPad and the Samsung Galaxy Tab, laptops, and the like. And the database may include preferred settings of such devices predetermined by the provider to optimize the video and audio recordings of the user using such devices. As such, the filming module may automatically adjust the camera settings and the microphone settings of the user's device while recording the user interview in order to optimize the recording and provide a professional-quality final video.

With the camera and the microphone of the user's device optimized, filming module 40 may record a raw video of the user interview via the user's device and save the raw video to network video storage in an otherwise conventional manner. The network video storage may be on the provider's internal servers or on external third-party servers, or a combination thereof in a cloud computing environment. Preferably, the filming module also causes the raw video to be recorded and temporarily saved locally on user device 32 (e.g., to local video storage on user device 32) in an otherwise conventional manner.

In accordance with various aspects of the present invention, the raw video recording of the user is recorded and stored at two locations, (1) temporarily by user's device and (2) longer-term by video generating system 30. Ultimately, both raw videos are uploaded and stored on the system's servers, however, the dual recording allows for redundancy and quality assurance. Today's smartphones, tablets, notebooks, laptops, desktops and other electronic devices are capable of quickly converting raw recording into an actual video file that is transmitted to video generating system 30. However, fatal errors in transmission and other events could prevent this video file from being sent during an on-device session. Accordingly, the raw video file that is generated and temporarily stored locally on the user device may be better (e.g., higher resolution, not interrupted, not cutoff, etc.) than the raw video recorded by video generating system. When it is time to generate the final video (as discussed below), the system may utilize the local-stored raw video file to generate a higher-resolution final video. In particular, the local-stored raw video file may be uploaded at the end of the on-device session or post-session to ensure a final video of the best resolution available.

Preferably, filming continues throughout the on-device session and captures the entire user interview including any user dialog spoken in addition to scripted readings. Filming may record all the user's responses to the prompted questions during the scripting mode. Filming may also record the user's readings of the final script (and any preliminary scripts). And filming may also record the user during any coaching segments of the on-device session. All responses may be filmed, recorded, and transcribed to allow for AI and/or ML to generate additional questions for the user during the session, and to improve upon the various questionnaires for future users, promoting quality and scalability. All the user's script readings are filmed, recorded, and transcribed in order to provide various "takes" that may be used in generating the final video. And all coaching segments may also be filmed, recorded, and transcribed to allow for AI and/or ML to provide improved prompts for future users, again promoting quality and scalability.

Filming module 40 may include an AI or ML and/or human coaching prompter configured to coach the user during the user interview. Coaching may include a series of coaching prompts in the form of interactive cues instructing the user to properly adjust their camera, look toward the camera, properly speak toward the microphone, and/or other prompts to promote a professional-looking recording. Coaching may also include a series of coaching prompts instructing the user in how to read script lines, including vocal coaching suggestions to improve diction, voice intonation, vocal pace, and the like. Alternatively, the filming module may be configured to allow for real-time streaming with a video coach during the on-device session that can provide similar instruction and guidance.

Figure 7:
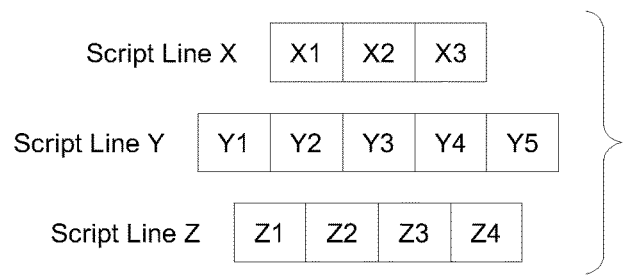
FIG. 7 is an exemplary illustration of a series of script lines generated by the system of FIG. 1.

With continued reference to FIG. 3, filming module 40 may include a script reading prompter to guide the user through several readings of the script. FIG. 7 is an exemplary illustration of three script lines that may be provided to the user. Preferably the prompter is audible, in which case it may further serve to coach the user by providing a suggested reading of each script line in terms of intonation, pace, and/or other criteria. The prompter may also be visual providing the text of each script line. Preferably, the prompter provides the entire script to the user, from the first line to the last line, multiple times in order to record the user reading through the entire script several times.

Preferably, the filming module records the user reading the entire script several times in order to provide a sufficient number of "takes" that may be utilized for generating the final video. For the sake of clarity, the illustrated filming module includes an initial-read script prompter and a subsequent-read script prompter, but one will appreciate that the filming module may prompt the user to read the script two, three, four or more times to record a sufficient number of suitable takes.

The raw video includes (1) an initial vocal reading by the user via the user device during which (a) a first script line is provided to the user and the user reads aloud the first script line, (b) a next script line is provided to the user and the user reads aloud the next script line, until (c) a final script line is provided to the user and the user reads aloud the final script line, and (2) a subsequent reading by the user via the user device during which (a) the first script line is provided to the user and the user reads aloud the first script line, (b) the next script line is provided to the user and the user reads aloud the next script line, until (c) the final script line is provided to the user and the user reads aloud the final script line. As such, the raw video includes the user performing several read-throughs of the entire script.

In its simplest form, the filming module may allow an administrator to audibly provide the script lines and/or coaching prompts to the user while the video recorder captures the user's multiple readings of the script lines and/or responses to the coaching prompts. One will appreciate that the use of AI and ML in providing the script lines and/or coaching prompts will also significantly improve scalability.

With reference to FIG. 6, the editing module is generally configured for editing the user interview into the personal branding message. The editing phase transcodes the raw video (step 310), processes the transcoded video (step 320), transcribes the raw video (step 330), identifies each of the words spoken by the user during the recorded user interview (step 340), timestamps each of the words spoken by the user (step 350), segments the words spoken by the user into various word groups (step 360), matches word groups to the script lines (step 370), compares confidence levels of similarly matched word groups and calculates confidence levels of each word group corresponding to a script line (step 380), and selects "best takes" of matching word groups for the final video (step 390).

Figure 4:
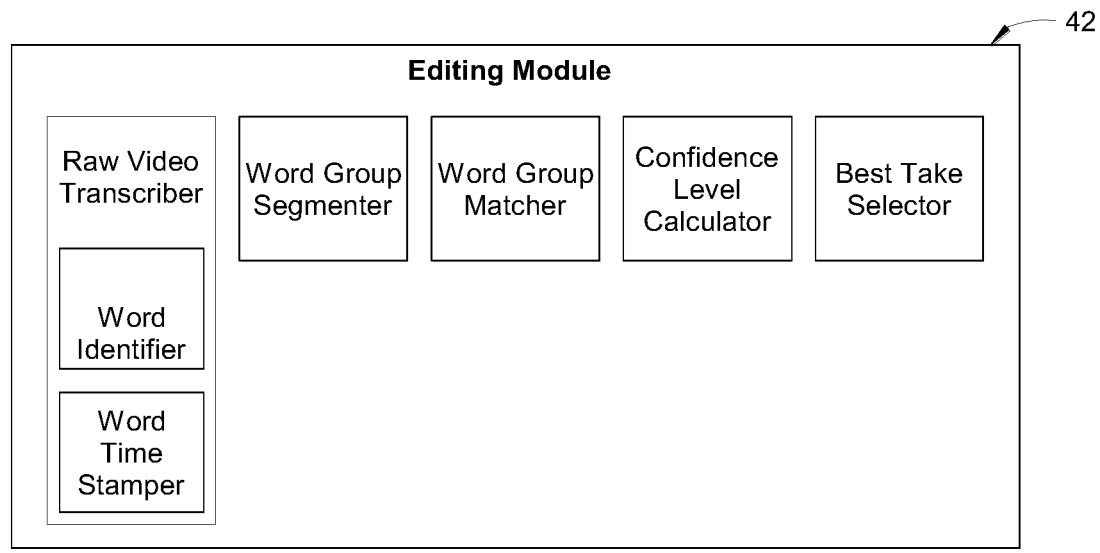
FIG. 4 is a block diagram illustrating an exemplary editing module of the system of FIG. 1.
Figure 8:
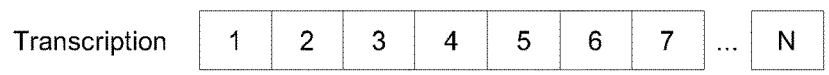
FIG. 8 is an exemplary illustration of a transcription of dialog of a user recorded by the system of FIG. 1.

Turning to FIG. 4, editing module 42 includes a raw video transcriber that transcribes the raw video in which each word spoken by the user during filming of the user interview is transcribed. An exemplary illustration of a transcription of the user's recorded dialog captured by the raw video is shown in FIG. 8. The transcription includes the initial script reading by the user, the final script reading, and each and every intermediate script reading therebetween. The transcription may also include all other portions of the raw video capturing all of the dialog spoken during the user interview, including any user responses to prompted questions, user readings of script lines, and coaching prompts and user responses during the on-device session.

Each word spoken by the user during the user interview (and recorded on the raw video) is identified and transformed into text form, and each word is time-stamped with the time at which the word appears in the raw video. In other words, the transcription identifies what each word is, and when each word appears, in the raw video. Preferably, the transcription process provides a timestamp for the beginning of each word and the end of each word. The transcription may be accomplished by proprietary means or by otherwise known means, including but not limited to Amazon Transcribe provided by Amazon Web Services (AWS), and/or other commercially available transcription services. Such transcription of the raw video may be performed after the user interview is completed, and/or it may be performed as the raw video is streamed to the video generating system for real-time transcription.

Editing module 42 also includes a word-group segmenter that utilizes software programs and/or algorithms to divide the transcription into a plurality of segments or word groupings. Existing transcription services provide a first pass of word-group segmenting in that such services have means to insert punctuation including periods and commas thereby grouping transcribed words into sentences and/or sentence clauses. The editing module may be configured to independently group words into sentences and/or sentence clauses by analyzing the pauses between adjacent words of the transcription, which generally indicates the user's pauses between script lines. All "pauses" in a user's speech may be considered. A pause may correspond to punctuation of the transcription that may indicate a pause in the user's vocal reading of a script. For example, a period (".") may indicate a relatively long pause and a comma (",") may indicate a relatively short pause between successive words. A pause may correspond to linguistic fillers such as "um", "uh", "ah", "like", and/or other hesitation markers between incomplete sentence thoughts. And a pause may correspond to threshold delays between two transcribed words, that is, predetermined periods of time between successive transcribed words.

The editing module may be provided with a specified set of "comma" and "period" times that may be used to determine the correct type of "pause" based upon the delay between successive words. For example, the editing module may be configured to interpret a 0.02 second pause between the ending timestamp of a word and the beginning timestamp of the next word to indicate a comma in the user's dialog, and a 0.05 second pause to indicate a period in the user's dialog. Multiple sets of comma and period timings can be applied to the transcript, and therefore generate multiple word groupings segmented based on the various sets of comma and period times. One will appreciate that these time periods may be varied depending upon the user's speech, adjusting for shorter pauses for a fast talker, and longer pauses for a slow talker.

Unfortunately, transcription services generally do not render perfect transcriptions. Accordingly, additional means may be needed to further divide the transcription into additional word groupings in order to sufficiently match word groupings to script lines, as discussed below. In accordance with various aspects of the present invention, the editing module is preferably configured to perform a brute-force or exhaustive word-group segmentation in order to ensure that one or more word groupings match each script line. In particular, the segmenter may divide the entire transcription into one-word groupings (in which every word of the transcription is a word grouping), two-word groupings, three-word groupings, and so on, until the segmenter cannot break the transcription down to further word groupings.

For example, if the transcription has N words, the word-group segmenter will divide the transcription into N one-word groupings. The segmenter will also divide the transcript into "N−1" two-word groupings, with the first word forming the beginning of the first two-word grouping, the second word forming the beginning of the second two-word grouping, and so on until no further two-word groupings can be formed (i.e., until the second-to-last transcribed word of the transcription). The segmenter will also divide the transcript down to "N−2" three-word groupings, with the first word forming the beginning of the first three-word grouping, the second word forming the beginning of the second three-word grouping, and so on until no further three-word groupings can be formed (i.e., until the third-to-last transcribe word of the transcription). The segmenter continues the process with four-word groupings, five-word groupings, and so on to a single N-word grouping encompassing all of the transcribed words of the raw video.

Figure 9:
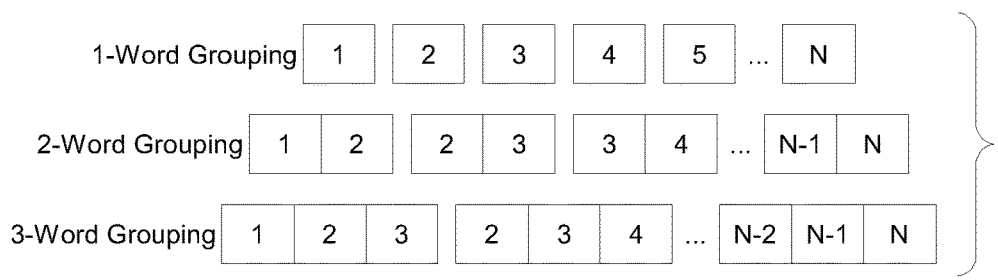
FIG. 9 is an exemplary illustration of the transcription segmented into a plurality of word groupings by the system of FIG. 1.

FIG. 9 is an exemplary illustration of the transcription being broken down into various word groupings (from the transcription shown in FIG. 8). The numerals 1, 2, 3, . . . to N represent the sequential words of the transcribed raw video in which N words have been transcribed. The set of one-word groupings includes a separate word grouping for each transcribed word. The set of two-word grouping includes groupings formed with every transcribed word (except the last word of the transcription), and the last word of each two-word grouping overlaps with the first word of the next. The set of three-word groupings includes grouping formed with every transcribed word (except the last two words of the transcription), and the last two words of each three-word grouping overlap the first two of the next. And so on.

If the transcription has 100 words, the word-group segmenter will divide the transcription into 100 one-word groupings, 99 two-word groupings, 98 three-word groupings, and so on, ending with a one 100-word grouping, for a total of 5,050 word groupings. And if the transcription has 500 words, the word-group segmenter will divide the transcription into 500 one-word groupings, 499 two-word groupings, 498 three-word groupings, and so on, ending with one 500-word grouping, for a total of 125,250 word groupings.

The total number of word groupings WG created by a transcript having N words may be determined as follows:

$$WG = [(N+1)N]/2 \qquad \text{Eq. (1)}$$

Editing module 42 also includes a word-group matcher that determines whether each word grouping corresponds to a script line or portion thereof. In other words, the matcher determines whether each word grouping is a candidate for corresponding with any of the script lines. In its simplest form, the word-group matcher may simply identify the script line has having a certain number of words, and may then compare each word grouping have the same number of words, and/or may then eliminate word groupings that have vastly dissimilar number of words as compared to the desired word grouping of a script line. For example, and with reference to FIG. 10, if a script line (e.g., Script Line X) has three words, the word-group matcher would match each of the three-word groupings to the script line for comparison. Similarly, if a script line were four, five or ten words long, the word-group matcher would match each of the four-, five-, or ten-word groupings for comparison, respectively.

The editing module also includes a confidence-level calculator to determine the likelihood or "confidence" that a given word grouping matches a script line or portion thereof. In its simplest form, the calculator assigns a confidence level that corresponds to the percentage of matching words between candidate groupings and script lines. For example, if a script line has three words and a candidate grouping has the same three words, the candidate grouping would be assigned a confidence of 1.00. If only two of the three words match, the candidate grouping would be assigned a confidence of 0.67. And if only one word matches, a confidence of 0.33. Similarly, if a script line had ten words and a candidate grouping has nine-of-ten words the same, it would be assigned a confidence level of 0.90, eight-of-ten words would receive a confidence level of 0.80, and so on.

Alternatively, confidence may be determined on the basis of keywords. Keywords generally include open classes of words such as nouns, verbs, adjectives, and adverbs, and keywords generally do not include closed classes of words such as articles, pronouns, and conjunctions. In order to provide a close approximation of open classes, words having four or more letters may be assumed to be keywords, whereas words having three or fewer letters may be assumed not to be keywords.

Figure 10:
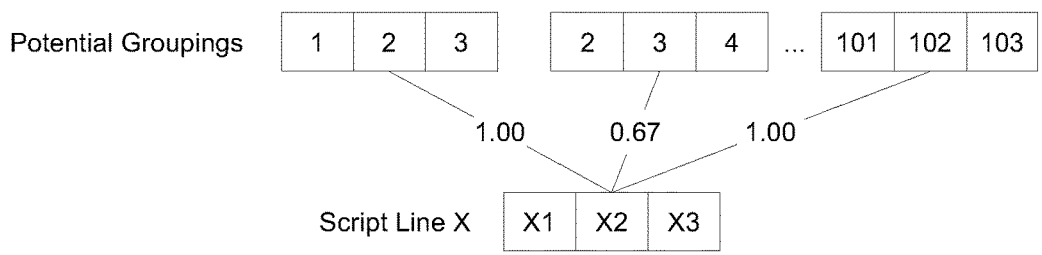
FIG. 10 is an exemplary illustration of matching candidate word groupings with a script line by the system of FIG. 1.

With reference to FIG. 10, if Script Line X were the first script line, and the transcription began with the user reading the first script line, the first candidate grouping (of a similar word count) should include all of the same words. In the illustrated example, three-of-three words match and thus would receive a confidence level of 1.00. However, the second candidate grouping would only include two-of-three identical words, and thus would have a lower confidence level of 0.67. And the next candidate grouping (not shown) would include only one-of-three words and have an even lower confidence level of 0.33. Thus, the system could be relatively confident that the first candidate grouping corresponds to the Script Line X.

As noted above, the user will generally complete several readings of the final script, and thus the user will have performed several "takes" of each script line. Thus, there may be several candidate groupings having similar confidence levels. This is illustrated in FIG. 10 in which, the first candidate grouping are the first words spoken by the user during the first "take" or run-through of the script (represented by numerals 1, 2, 3), and the last illustrated grouping has the first words spoken by the user during a subsequent "take" of the script (represented by numerals 101, 102, 103). For example, if the words of Script Line X were "I am Sue", the first candidate grouping including the first words spoken by the user should also be the words "I am Sue". Now assuming the final script is 100 words long, the second "take" of the script would begin at transcribed word 101. Thus, transcribed words 101, 102, 103 should also be "I am Sue", and would be assigned a similar confidence level of 1.00.

One will appreciate that commercially available transcription services generally do not render perfect transcriptions—the transcribed words do not always match the spoken words. This may be due to poor algorithms, poor recordings, poor equipment, poor performance, or even poor diction. Accordingly, different run-throughs of the script may be transcribed differently. For example, a user might say "Hi, I am Sue" during the first take, but say "I am Sue" during the second take. Accordingly, the editing module may be configured to compare various word groupings to the script lines and assign confidence levels in connection with particular script lines. In this case, extending the candidate groupings to include four-word groupings might capture "Hi, I am Sue" as a potential match to "I am Sue" and may serve as an alternative or acceptable take. And candidate groupings may be extended to word groupings having one, two or more word differences in the total number of words between word groupings and script lines, and the determined confidences may be weighted based upon the total number of different words, whereas the confidence is weighted less when the number of different words increases. AI and/or ML may be utilized to predict whether the take is indeed acceptable and thus provide weighting to adjust the confidence levels of candidate groupings that have more or less words than the relevant script line.

Editing module 42 also includes a best take selector that compares the confidence level of each word grouping from the initial reading of the script lines (e.g., the first "take") with the confidence levels of corresponding word groupings from the subsequent readings (e.g., the second "take", the third "take", etc.) to determine a "best take" between the each of the corresponding word groupings.

The best take may be determined by confidence level alone. For example, if one word grouping for a script line has a confidence level that far exceeds all other word groupings, it may be distinguished as the best take. However, if multiple word groupings have the same or similar confidence levels, the best take may be determined by considering other criteria and parameters, including, but not limited to timing, cadence, volume, speed, intonation, diction, eye contact, and/or perceived emotions. For example, if a "maximum pause" in a word grouping is greater than a predetermined factor, or if the "average pause" is a word grouping is above or below a predetermined factor, the confidence of that word grouping may be reduced by a weighted factor. AI and/or ML may be utilized to factor such other criteria and parameters in determining the confidence levels. One will appreciate that one or more weighted factors may be applied to confidence levels of the word groupings.

For example, the best take among word groupings with similar confidence levels may further be based on the respective word time stamps and/or the respective grouping time stamps. Users generally becomes more comfortable with their script lines as they read through them, and subsequent takes or run-throughs of the script are generally better—the user may look or sound more relaxed during a second or third take. Accordingly, it may be assumed that later well-delivered script lines are better than earlier ones, and that word groupings found later in the transcription are better than earlier ones. Thus, among word groupings with similar confidence levels, a word grouping bearing a later time stamp may be distinguished as the best take (e.g., candidate grouping 101, 102, 103 in FIG. 10).

Alternatively, word groupings with similar confidence levels may be presented to the user and/or an administrator for manual selection of the best take. Accordingly, the portions of the raw video corresponding to such word groupings may be queued and played back to the user and/or administrator for selection of the best take. One will appreciate, however, that an automated process such as the one described immediately above is preferred as such will significantly improve scalability.

Once the "best takes" have been determined by the editing module, the "best takes" of each script line (or portion thereof) may be used to generate the final video.

With reference to FIG. 6, the generating module is generally configured for generating the final video based upon the best takes. The generating module optionally allows for transcoding the raw video (step 410) and processing the transcoded video (step 420) at this state to aid in sound quality and to change the format of the edited video for use in a specific environment or device. The generating module is generally configured for generating the final video (step 430). The generating module may also be configured to automatically generate a branding page incorporating the final video (step 440) and/or otherwise uploading or posting the final video to various online platforms and social media.

Figure 5:
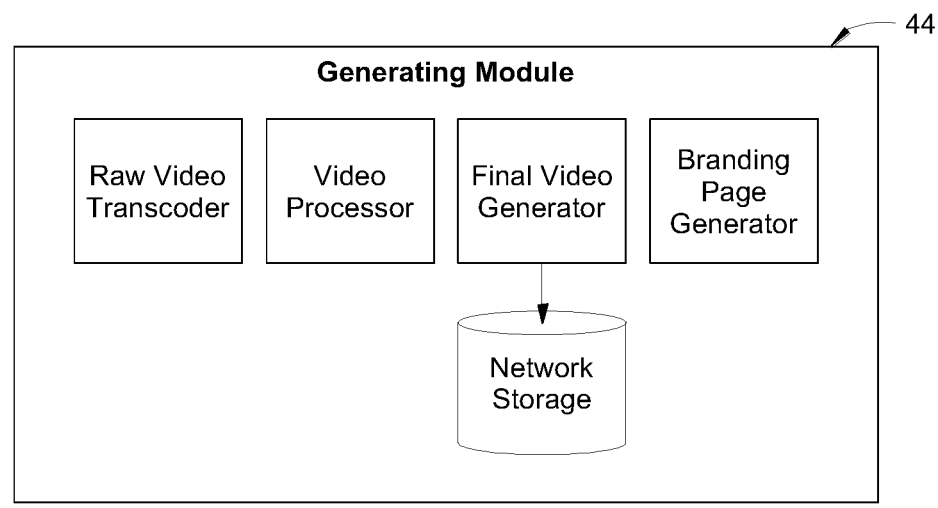
FIG. 5 is a block diagram illustrating an exemplary generating module of the system of FIG. 1.

Turning to FIG. 5, generating module 44 includes a raw video transcoder that processes the raw video to a preferred video file format. For example, the transcoder may convert the raw video from the available or default formats of various user devices (e.g., MP4, MOV, WMV, AVI, AVCHD, FLV, F4V, SWF, MKV, WEBM, HTML5, MPEG-2, etc.) to one or more predetermined video file formats. Such conversion may enhance processability in generating the final video, and/or compatibility of the final video with various online platforms and social media. For example, the raw video may be converted to MP4 video file format which provides high-quality video with relatively small file sizes, and which is widely compatible with YouTube, LinkedIn, Facebook, TicTok and other social media websites.

The generating module also includes a video processor for processing the raw video into a plurality of video fragments, each video fragment corresponding to each of the best takes. The video fragments may then be assembled into a "final cut" or final video that corresponds to the entire final script. Thus, the video processor completes the process of assembling a final video of the user communicating their personal branding message.

Video transcoding is generally time and resource consuming, and one will appreciate that it may be more efficient to transcode only the portions of the raw video that correspond to the best takes.

Such transcoding and processing may be accomplished by proprietary means or by otherwise known means. For example, the OpenShot video editor offers a stable user-friendly application programing interface (API) that may readily be configured to transcode and process the "best takes" form the editing module. One will appreciate that various other video editors may be utilized including open-source and/or commercially available editors.

In its simplest form, the final video may be a script read aloud by the user during the on-device session of the user interview. The final video may be used to provide prospective clients, colleagues, or employers with a better sense of their identity, professionalism, and skills. One will appreciate that multiple videos may be produced from one on-device session, in which case, various final scripts may be developed for different intended audiences.

Once the final video is generated, the user as a personal branding message that may be provided directly to prospective clients, colleagues, and/or employers, or posted on various social media and other online platforms.

The video generating system may be further configured to provide other value-adds for the user. For example, the system may be configured to create a personal branding webpage for the user that is hosted by the video-generating provider. The personal branding webpage may include the final video along with other relevant information about the user. The personal branding webpage may also include a headshot picture of the user or other derivative images generated by a still or screen shot from the raw video and/or the final video. The system may also be configured to create a customizable email signature block featuring the user's headshot picture in an HTML signature block with direct links to the personal branding page and/or social media posts.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A computer-implemented method for generating a video from a script read aloud by a user, the method comprising:

storing a questionnaire including a plurality of discrete prompts;

presenting the plurality of discrete prompts to the user via a user device;

recording a user response to each of the discrete prompts via the user device;

generating a video script based upon the user responses to each of the plurality of discrete prompts, the video script including a plurality of script lines;

recording a raw video of the user via the user device, the raw video including: (a) an initial reading during which (i) a first script line is provided to the user and the user repeats the first script line, and (ii) a final script line is provided to the user and the user repeats the final script line; and (b) a subsequent reading by the user via the user device during which (i) the first script line is provided to the user and the user repeats the first script line, and (ii) the final script line is provided to the user and the user repeats the final script line;

transcribing the raw video to generate a transcription including the initial reading and the subsequent reading, the transcription including identified words of the initial and subsequent readings;

segmenting the transcription into a plurality of segments, each segment including a word grouping;

matching each word grouping to a portion of each script line;

calculating a confidence level of the matching between each word grouping and each portion of each script line;

comparing the confidence level of each word grouping from the initial reading with the confidence level of a corresponding word grouping from the subsequent reading to determine a best take between the each of the corresponding word groupings;

selecting the best takes for each portion of each script line to populate the video script;

processing the raw video into a plurality of video fragments, each video fragment corresponding to each of the best takes;

generating a final video of the entire video script, the final video including each of the video fragments corresponding to each of the best takes; and coaching the user in reading the video script via the user device.

2. The method according to claim 1, wherein the storing a questionnaire comprises storing a plurality of field-specific questionnaires, each field-specific questionnaire comprising a plurality of discrete field-specific prompts.

3. The method according to claim 2, wherein at least one of the field- specific questionnaires includes field-specific prompts for one of the following fields: new college graduates; professional job seekers; marketing professionals; or real estate agents.

4. The method according to claim 1, further comprising: analyzing and revising the user responses to each of the discrete prompts; generating and presenting a preliminary script to the user via the user device; and recording user feedback based upon the preliminary script; wherein generating the video script is based upon the user feedback.

5. The method according to claim 1, further comprising assessing a camera and a microphone of the user device and adjusting the camera and microphone of the user device to predetermined criteria.

6. The method according to claim 1, wherein coaching the user includes providing a plurality of coaching prompts that instruct the user to (i) properly adjust a camera of the user device, (ii) look toward the camera, and (iii) properly speak toward a microphone of the user device.

7. The method according to claim 1, wherein the recording a raw video is accomplished by storing the raw video (i) on the user device and (ii) in a cloud-based storage system.

8. The method according to claim 1, wherein the first and final script lines are audibly provided to the user via the user device.

9. The method according to claim 1, further comprising determining the type of raw video and transcoding the raw video into a predetermined video format.

10. The method according to claim 1, wherein the transcribed video also includes a word timestamp for each of the identified words, and each word grouping has a grouping timestamp.

11. The method according to claim 10, wherein when multiple word groupings have similar confidence levels, the best take is further based on the respective word timestamps and the respective grouping timestamps.

12. The method according to claim 1, wherein the confidence level is based at least one of the following parameters: timing, cadence, volume, speed, intonation, or diction.

13. The method according to claim 1, wherein the confidence level is based on factors pertaining to the percentage of matching words of each word grouping to each portion of each script line.

14. The method according to claim 1, further comprising generating a personal branding page for the user, and the final video is displayed on the personal branding page.

15. The method according to claim 1, wherein the scripted reading is a scripted interview, and the final video is a video branding message including the video script.

16. A computer-implemented method for generating a video from a script read aloud by a user, the method comprising:

storing a questionnaire including a plurality of discrete prompts;

presenting the plurality of discrete prompts to the user via a user device;

recording a user response to each of the discrete prompts via the user device;

generating a video script based upon the user responses to each of the plurality of discrete prompts, the video script including a plurality of script lines;

recording a raw video of the user via the user device, the raw video including: (a) an initial reading during which (i) a first script line is provided to the user and the user repeats the first script line, and (ii) a final script line is provided to the user and the user repeats the final script line; and (b) a subsequent reading by the user via the user device during which (i) the first script line is provided to the user and the user repeats the first script line, and (ii) the final script line is provided to the user and the user repeats the final script line;

transcribing the raw video to generate a transcription including the initial reading and the subsequent reading, the transcription including identified words of the initial and subsequent readings;

segmenting the transcription into a plurality of segments, each segment including a word grouping;

matching each word grouping to a portion of each script line;

calculating a confidence level of the matching between each word grouping and each portion of each script line;

comparing the confidence level of each word grouping from the initial reading with the confidence level of a corresponding word grouping from the subsequent reading to determine a best take between the each of the corresponding word groupings;

selecting the best takes for each portion of each script line to populate the video script;

processing the raw video into a plurality of video fragments, each video fragment corresponding to each of the best takes; and generating a final video of the entire video script, the final video including each of the video fragments corresponding to each of the best takes;

wherein the transcription includes N words, and wherein segmenting the transcription includes segmenting (i) every word into a respective word grouping, (ii) every two words into a respective word grouping, (iii) every three words into a respective word grouping, and so on to (iv) every N-words into a respective grouping.

17. The method according to claim 16, wherein the confidence level is based at least one of the following parameters: timing, cadence, volume, speed, intonation, or diction.

18. The method according to claim 16, wherein the confidence level is based on factors pertaining to the percentage of matching words of each word grouping to each portion of each script line.

19. The method according to claim 16, further comprising generating a personal branding page for the user, and the final video is displayed on the personal branding page.

20. The method according to claim 16, wherein the scripted reading is a scripted interview, and the final video is a video branding message including the video script.

* * * * *